United States Patent
Okuda et al.

(10) Patent No.: US 9,409,478 B2
(45) Date of Patent: Aug. 9, 2016

(54) SWAY DETERMINATION DEVICE AND SWAY DETERMINATION METHOD

(75) Inventors: Yuji Okuda, Susono (JP); Shinya Kawamata, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/416,738

(22) PCT Filed: Jul. 26, 2012

(86) PCT No.: PCT/JP2012/069013
§ 371 (c)(1),
(2), (4) Date: Jan. 23, 2015

(87) PCT Pub. No.: WO2014/016942
PCT Pub. Date: Jan. 30, 2014

(65) Prior Publication Data
US 2015/0175001 A1  Jun. 25, 2015

(51) Int. Cl.
*B60K 28/06* (2006.01)
*B60R 16/02* (2006.01)
*B60W 40/08* (2012.01)
*B60W 50/14* (2012.01)
*G08G 1/16* (2006.01)

(52) U.S. Cl.
CPC .............. *B60K 28/066* (2013.01); *B60R 16/02* (2013.01); *B60W 40/08* (2013.01); *B60W 50/14* (2013.01); *G08G 1/167* (2013.01); *B60W 2040/0827* (2013.01); *B60W 2050/143* (2013.01); *B60W 2540/18* (2013.01); *B60W 2540/26* (2013.01); *B60W 2710/20* (2013.01)

(58) Field of Classification Search
CPC ..... B60K 28/066; B60K 28/00; B60W 50/14; B60W 40/08; B60W 2540/18; B60W 2040/0827; B60W 2710/20; B60W 2540/26; B60W 2050/143; G08G 1/167; B60R 16/02
See application file for complete search history.

(56) References Cited

U.S. PATENT DOCUMENTS

| 2002/0149161 | A1* | 10/2002 | Smith | B60G 17/016 280/5.507 |
| 2007/0001510 | A1* | 1/2007 | Miller | B60T 8/1764 303/149 |
| 2009/0082925 | A1* | 3/2009 | Wijffels | B62D 6/003 701/42 |
| 2009/0272592 | A1* | 11/2009 | Gaffney | B60T 8/1755 180/197 |

(Continued)

FOREIGN PATENT DOCUMENTS

| JP | 2002-183900 A | 6/2002 |
| JP | 2008-217274 A | 9/2008 |

(Continued)

*Primary Examiner* — Rodney Butler
(74) *Attorney, Agent, or Firm* — Sughrue Mion, PLLC

(57) ABSTRACT

A wobble determination device 1 appropriately determines the wobble of a vehicle and does not cause inconvenience for a driver.
The wobble determination device 1 includes a steering determination unit 41 that determines whether the driver of a vehicle performs sudden steering after a non-steering state of the driver is maintained for a predetermined period of time and performs sudden return steering over a steering position in the non-steering state in a direction opposite to a direction of the sudden steering after the sudden steering and a wobble determination unit 42 that determines that the vehicle wobbles when the steering determination unit 41 determines that the steering of the driver is the sudden return steering which is performed over the steering position in the non-steering state.

11 Claims, 12 Drawing Sheets

(56) References Cited

U.S. PATENT DOCUMENTS

| | | | | |
|---|---|---|---|---|
| 2010/0042294 A1* | 2/2010 | Lich | ................... | B60R 21/0132 701/41 |
| 2011/0202241 A1* | 8/2011 | Le | ....................... | B60R 21/0134 701/46 |
| 2011/0257860 A1* | 10/2011 | Getman | ............... | B60T 8/1755 701/70 |
| 2011/0301824 A1* | 12/2011 | Nelson | .................. | B60K 26/04 701/102 |
| 2012/0049617 A1* | 3/2012 | Furuyama | ............. | B60T 8/1766 303/9.75 |
| 2014/0136070 A1* | 5/2014 | Yasui | .................. | B60T 8/17555 701/70 |

FOREIGN PATENT DOCUMENTS

| | | |
|---|---|---|
| JP | 2008-225899 A | 9/2008 |
| WO | 2008/114839 A1 | 9/2008 |

* cited by examiner

US 9,409,478 B2

SWAY DETERMINATION DEVICE AND SWAY DETERMINATION METHOD

CROSS REFERENCE TO RELATED APPLICATIONS

This application is a National Stage of International Application No. PCT/JP2012/069013 filed Jul. 26, 2012, the contents of which are incorporated herein by reference in their entirety.

TECHNICAL FIELD

The present invention relates to a wobble determination device and a wobble determination method that determine the wobble of a host vehicle and control the host vehicle while the vehicle is traveling.

BACKGROUND ART

In recent years, a wobble determination device and a wobble determination method have been known which detect the wobble of a host vehicle on the basis of white line information that is input from, for example, a white line detection sensor, determine the degree of wakefulness of the driver of the vehicle on the basis of the wobble state of the vehicle, and issue a warning to the driver when it is assumed that the consciousness of the driver has been degraded from the degree of wakefulness.

CITATION LIST

Patent Literature

[Patent Literature 1] Japanese Unexamined Patent Application Publication No. 2008-225899

SUMMARY OF INVENTION

Technical Problem

As the wobble determination device which determines the wobble of the host vehicle, a wobble determination device is considered which determines that the vehicle wobbles when the driver performs steering and performs steering again in the direction opposite to the direction of the steering.

However, in the wobble determination device, in some cases, when the driver turns the steering wheel to correct the steering in order to respond to a variation (for example, a curve or a side wind) in the environment around the vehicle and the vehicle wobbles due to the steering, a warning is issued even though the consciousness of the driver has not been degraded. In this case, there is a concern that the driver will be bothered.

The invention has been made in order to solve the above-mentioned technical problems and an object of the invention is to provide a wobble determination device and a wobble determination method that can appropriately determine the wobble of the vehicle and do not cause inconvenience for the driver.

Solution to Problem

That is, according to an aspect of the invention, a wobble determination device includes: a steering determination unit configured to determine whether a driver of a vehicle performs sudden steering and performs sudden return steering over a steering position at the beginning of the sudden steering in a direction opposite to a direction of the sudden steering after the sudden steering; and a wobble determination unit configured to be more likely to determine that the vehicle wobbles as the amount of sudden return steering increases when the steering determination unit determines that the steering of the driver is the sudden return steering which is performed over the steering position at the beginning of the sudden steering.

According to the above-mentioned aspect of the invention, it is determined that the vehicle wobbles when sudden steering is performed and sudden return steering is performed over the steering position at the beginning of the sudden steering in the direction opposite to the direction of the sudden steering after the sudden steering. The sudden return steering operation which is performed over the steering position at the beginning of the sudden steering in the opposite direction after the sudden steering (first correction steering) is considered as correction steering which occurs when the consciousness of the driver is degraded. It is possible to appropriately determine the wobble of the vehicle when it is assumed that the consciousness of the driver is degraded. In contrast, when sudden steering is performed, but sudden return steering is not performed over the steering position at the beginning of the sudden steering in the opposite direction, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver. In addition, the wobble determination device is more likely to determine that the vehicle wobbles as the amount of sudden return steering increases. It is possible to change the ease of the wobble determination depending on the amount of sudden return steering. Therefore, it is possible to provide a wobble determination device which can appropriately determine the wobble of the vehicle and does not cause inconvenience for the driver.

According to another aspect of the invention, a wobble determination device includes: a steering determination unit configured to determine whether a driver of a vehicle performs sudden steering and performs sudden return steering over a steering position at the beginning of the sudden steering in a direction opposite to a direction of the sudden steering after the sudden steering; and a wobble determination unit configured to determine that the vehicle wobbles when the steering determination unit determines that the steering of the driver is the sudden return steering which is performed over the steering position at the beginning of the sudden steering.

According to the above-mentioned aspect of the invention, it is determined that the vehicle wobbles when sudden steering is performed and sudden return steering is performed over the steering position at the beginning of the sudden steering in the direction opposite to the direction of the sudden steering after the sudden steering. The sudden return steering operation which is performed over the steering position at the beginning of the sudden steering in the opposite direction after the sudden steering (first correction steering) is considered as correction steering which occurs when the consciousness of the driver is degraded. It is possible to appropriately determine the wobble of the vehicle when it is assumed that the consciousness of the driver is degraded. In contrast, when sudden steering is performed, but sudden return steering is not performed over the steering position at the beginning of the sudden steering in the opposite direction, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver.

According to still another aspect of the invention, a wobble determination device includes: a steering determination unit configured to determine whether a driver of a vehicle performs sudden steering after a non-steering state of the driver is maintained for a predetermined period of time and performs sudden return steering over a steering position in the non-steering state in a direction opposite to a direction of the sudden steering after the sudden steering; and a wobble determination unit configured to determine that the vehicle wobbles when the steering determination unit determines that the steering of the driver is the sudden return steering which is performed over the steering position in the non-steering state.

According to the above-mentioned aspect of the invention, it is determined that the vehicle wobbles when sudden steering is performed and sudden return steering is performed over the steering position in the non-steering state in the direction opposite to the direction of the sudden steering after the sudden steering. The sudden return steering operation which is performed over the steering position in the non-steering state in the opposite direction after the sudden steering (first correction steering) is considered as correction steering which occurs when the consciousness of the driver is degraded. It is possible to appropriately determine the wobble of the vehicle when it is assumed that the consciousness of the driver is degraded. In contrast, when sudden steering is performed, but sudden return steering is not performed over the steering position in the non-steering state in the opposite direction, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver.

In the wobble determination device according to the above-mentioned aspects of the invention, the steering determination unit may determine that the driver is in the non-steering state when a steering input of the driver is equal to or less than a predetermined value for a predetermined period of time and determine that the steering of the driver is the sudden steering when the steering input of the driver after the non-steering state is equal to or greater than the predetermined value for the predetermined period of time. According to this structure, it is possible to accurately determine the non-steering state and the sudden steering and to accurately determine whether the vehicle wobbles.

In the wobble determination device according to the above-mentioned aspects of the invention, when the steering input of the driver is equal to or greater than the predetermined value for the predetermined period of time and the steering is performed in the direction opposite to the direction of the sudden steering after the sudden steering, the steering determination unit may determine that the steering in the opposite direction is the sudden return steering. According to this structure, it is possible to accurately determine the sudden return steering and to appropriately determine whether the vehicle wobbles.

In the wobble determination device according to the above-mentioned aspects of the invention, the steering determination unit may determine that the steering in the opposite direction is the sudden return steering when a time interval from a time when a steering input is the maximum during the sudden steering to a time when a steering input is the maximum during the steering which is performed in the direction opposite to the direction of the sudden steering is equal to or less than a predetermined value. When the vehicle rounds an S-curve, sudden steering and steering in a direction opposite to the direction of the sudden steering are continuously performed. Therefore, the steering is likely to be erroneously determined to be the wobble of the vehicle due to the degradation of the consciousness of the driver. In contrast, according to the above-mentioned structure, it is possible to consider the time interval from the sudden steering to the steering which is performed in the direction opposite to the direction of the sudden steering. Therefore, it is possible to prevent erroneous determination that the vehicle is rounding the S-curve. That is, it is possible to appropriately determine the wobble of the vehicle.

In the wobble determination device according to the above-mentioned aspects of the invention, the steering determination unit may determine the steering in the opposite direction is the sudden return steering when a value of a steering position where a steering input is the maximum during the steering which is performed in the direction opposite to the direction of the sudden steering is equal to or greater than a value of a predetermined position in the direction of the steering which is performed in the direction opposite to the direction of the sudden steering. In correction steering which occurs when the consciousness of the driver is degraded, the steering in the opposite direction after the sudden steering is performed over a predetermined steering position. According to the above-mentioned structure, the steering in the opposite direction, which is the correction steering which occurs when the consciousness of the driver is degraded, can be determined to be the sudden return steering. That is, it is possible to appropriately determine the wobble of the vehicle.

In the wobble determination device according to the above-mentioned aspects of the invention, the steering determination unit may use, as the predetermined position, a position which is obtained by adding a predetermined value to the steering position in the non-steering state immediately before the steering in the opposite direction is performed in the direction of the steering which is performed in the opposite direction. According to this structure, it is possible to improve criteria for determining the sudden return steering and to prevent the wobble of the vehicle due to correction steering from being erroneously determined to be the wobble of the vehicle due to the degradation of the consciousness of the driver.

In the wobble determination device according to the above-mentioned aspects of the invention, the steering determination unit may determine that the steering in the opposite direction is the sudden return steering when a first interval is from the steering position in the non-steering state to a steering position where a steering input is the maximum during the sudden steering which is performed after the non-steering state, a second interval is from the steering position in the non-steering state to a steering position where a steering input is the maximum during the steering which is performed in the opposite direction after the sudden steering, and a ratio of the second interval to the first interval is equal to or greater than a predetermined value. According to this structure, a threshold value for determining the sudden return steering is not an absolute value, but can be the ratio of the steering positions. Therefore, it is possible to ensure constant determination accuracy, regardless of a vehicle speed or the type of vehicle.

According to yet another aspect of the invention, a wobble determination method includes: a steering determination step of determining whether a driver of a vehicle performs sudden steering and performs sudden return steering over a steering position at the beginning of the sudden steering in a direction opposite to a direction of the sudden steering after the sudden steering; and a wobble determination step of being more likely to determine that the vehicle wobbles as the amount of sudden return steering increases when it is determined in the steering determination step that the steering of the driver is the sudden return steering which is performed over the steering position at the beginning of the sudden steering.

According to the above-mentioned aspect of the invention, it is determined that the vehicle wobbles when sudden steering is performed and sudden return steering is performed over the steering position at the beginning of the sudden steering in the direction opposite to the direction of the sudden steering after the sudden steering. The sudden return steering operation which is performed over the steering position at the beginning of the sudden steering in the opposite direction after the sudden steering (first correction steering) is considered as correction steering which occurs when the consciousness of the driver is degraded. It is possible to appropriately determine the wobble of the vehicle when it is assumed that the consciousness of the driver is degraded. In contrast, when sudden steering is performed, but sudden return steering is not performed over the steering position at the beginning of the sudden steering in the opposite direction, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver. In addition, the wobble determination device is more likely to determine that the vehicle wobbles as the amount of sudden return steering increases. It is possible to change the ease of the wobble determination depending on the amount of sudden return steering. Therefore, it is possible to provide a wobble determination device which can appropriately determine the wobble of the vehicle and does not cause inconvenience for the driver.

According to still yet another aspect of the invention, a wobble determination method includes: a steering determination step of determining whether a driver of a vehicle performs sudden steering and performs sudden return steering over a steering position at the beginning of the sudden steering in a direction opposite to a direction of the sudden steering after the sudden steering; and a wobble determination step of determining that the vehicle wobbles when it is determined in the steering determination step that the steering of the driver is the sudden return steering which is performed over the steering position at the beginning of the sudden steering.

According to the above-mentioned aspect of the invention, it is determined that the vehicle wobbles when sudden steering is performed and sudden return steering is performed over the steering position at the beginning of the sudden steering in the direction opposite to the direction of the sudden steering after the sudden steering. The sudden return steering operation which is performed over the steering position at the beginning of the sudden steering in the opposite direction after the sudden steering (first correction steering) is considered as correction steering which occurs when the consciousness of the driver is degraded. It is possible to appropriately determine the wobble of the vehicle when it is assumed that the consciousness of the driver is degraded. In contrast, when sudden steering is performed, but sudden return steering is not performed over the steering position at the beginning of the sudden steering in the opposite direction, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver.

According to yet still another aspect of the invention, a wobble determination method includes: a steering determination step of determining whether a driver of a vehicle performs sudden steering after a non-steering state of the driver is maintained for a predetermined period of time and performs sudden return steering over a steering position in the non-steering state in a direction opposite to a direction of the sudden steering after the sudden steering; and a wobble determination step of determining that the vehicle wobbles when it is determined in the steering determination step that the steering of the driver is the sudden return steering which is performed over the steering position in the non-steering state.

According to the above-mentioned aspect of the invention, it is determined that the vehicle wobbles when sudden steering is performed and sudden return steering is performed over the steering position in the non-steering state in the direction opposite to the direction of the sudden steering after the sudden steering. The sudden return steering operation which is performed over the steering position in the non-steering state in the opposite direction after the sudden steering (first correction steering) is considered as correction steering which occurs when the consciousness of the driver is degraded. It is possible to appropriately determine the wobble of the vehicle when it is assumed that the consciousness of the driver is degraded. In contrast, when sudden steering is performed, but sudden return steering is not performed over the steering position in the non-steering state in the opposite direction, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver.

Advantageous Effects of Invention

According to the invention, it is possible to provide a wobble determination device and a wobble determination method that can appropriately determine the wobble of a vehicle and does not cause inconvenience for a driver.

DESCRIPTION OF EMBODIMENTS

First Embodiment

Figure 1:
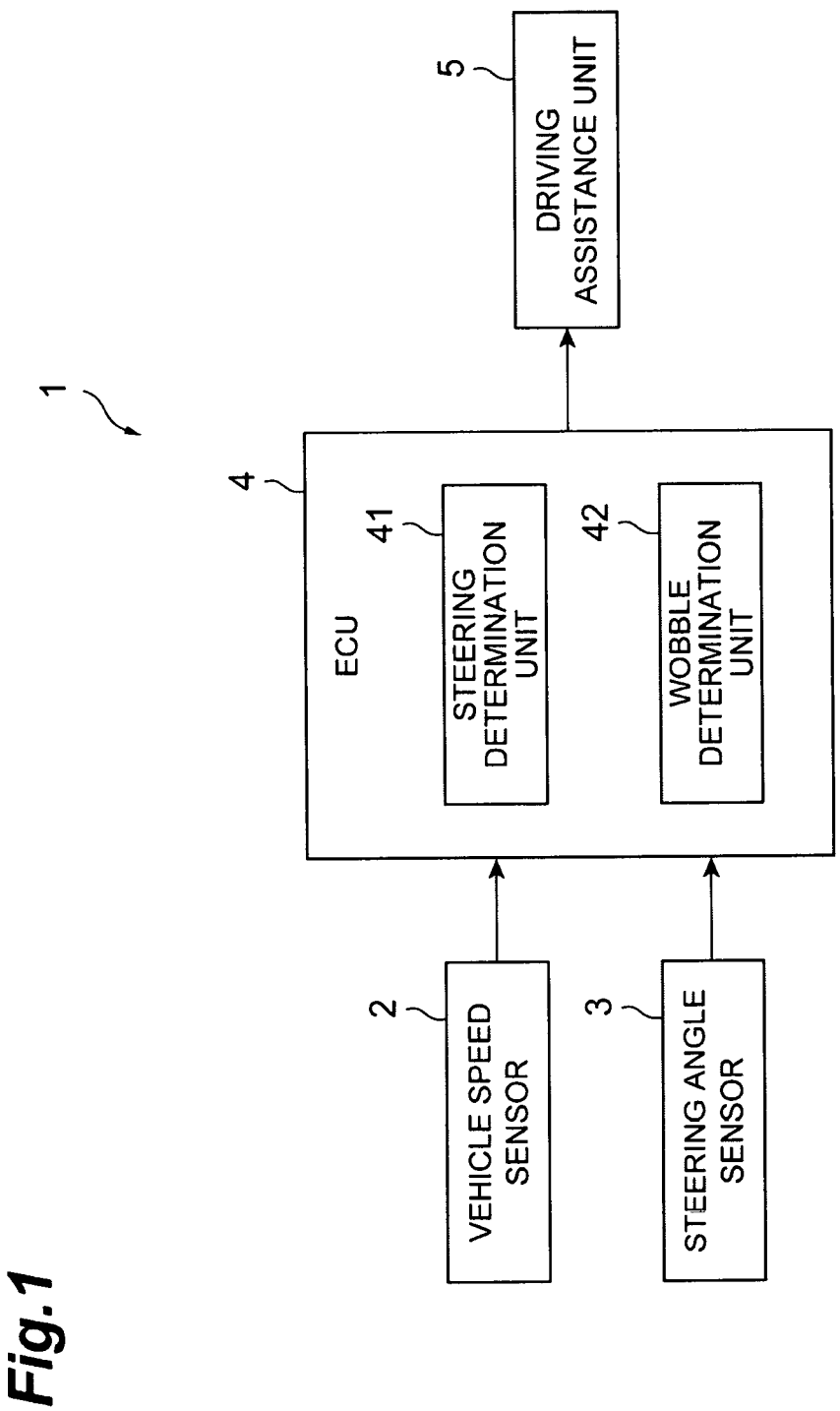
FIG. 1 is a schematic diagram illustrating the structure of wobble determination devices according to first to fourth embodiments.

Hereinafter, a first embodiment of the invention will be described with reference to FIGS. 1 to 4. If possible, the same components are denoted by the same reference numerals and the description thereof will not be repeated.

FIG. 1 is a schematic view illustrating the structure of a wobble determination device 1 according to the first embodiment. As illustrated in FIG. 1, the wobble determination device 1 includes a vehicle speed sensor 2, a steering angle sensor 3, an ECU 4, and a driving assistance unit 5.

The vehicle speed sensor 2 acquires wheel speed information (vehicle speed information) related to the speed of wheels. The vehicle speed sensor 2 is attached to, for example, the wheels of the vehicle. The vehicle speed information acquired by the vehicle speed sensor 2 is transmitted to the ECU 4 and is used by a wobble determination unit 42, which will be described below, to determine the wobble of the vehicle. The wobble determination is performed by the wobble determination unit 42 when the vehicle speed acquired by the vehicle speed sensor 2 is equal to or greater than a predetermined value.

The steering angle sensor 3 detects the steering angle of a steering wheel operated by a driver. The steering angle sensor 3 is attached to, for example, a steering rod of the vehicle. Steering angle information related to the steering angle which is detected by the steering angle sensor 3 is transmitted to the ECU 4 and is used by a steering determination unit 41, which will be described below, to determine a non-steering state, sudden steering, and sudden return steering and is also used by the wobble determination unit 42 to determine the wobble of the vehicle.

The ECU 4 controls the overall operation of the wobble determination device 1 and has, as a main component, a computer including, for example, a CPU, a ROM, and a RAM. The ECU 4 is connected to the vehicle speed sensor 2 and the steering angle sensor 3 and receives information from, for example, each of the connected sensors.

The ECU 4 includes the steering determination unit 41 and the wobble determination unit 42.

The steering determination unit 41 has a function of determining whether the driver of the vehicle performs sudden steering and then performs sudden return steering over a steering position at the beginning of the sudden steering in a direction opposite to the direction of the sudden steering after the sudden steering. In addition, the steering determination unit 41 has a function of determining whether the driver of the vehicle maintains a non-steering state for a predetermined period of time, performs sudden steering after the non-steering state, and then performs sudden return steering over the steering position in the non-steering state in the direction opposite to the direction of the sudden steering. The steering determination unit 41 determines the non-steering state, the sudden steering, and the sudden return steering on the basis of the information transmitted from the steering angle sensor 3 to the ECU 4.

When the steering input of the driver is equal to or less than a predetermined value for a predetermined period of time, the steering determination unit 41 determines that the driver is in the non-steering state. When the steering input of the driver is equal to or greater than the predetermined value within the predetermined period of time after the non-steering state, the steering determination unit 41 determines that the driver performs sudden steering.

When it is determined that the driver is in the non-steering state, a steering input that is equal to or less than a predetermined value is allowed and a very small steering input which is detected when the vehicle travels straight along a traveling path is equal to or less than the predetermined value. In addition, the predetermined period of time used in the process of determining the non-steering state is longer than the time required to appropriately determine that the driver is in the non-steering state due to, for example, the degradation of the consciousness of the driver.

The predetermined value used in the process of determining the sudden steering is the amount of steering that is more than the amount of steering in a steering operation when the vehicle travels along a traveling path with a general curve shape. In addition, the predetermined period of time used in the process of determining the sudden steering is shorter than a period from the non-steering state to the time when the amount of steering is the maximum when the vehicle travels along a traveling path with a general curve shape.

When the steering input of the driver is equal to or greater than the predetermined value within the predetermined period of time after sudden steering and the steering direction is opposite to the direction of the sudden steering, the steering determination unit 41 determines that the steering in the opposite direction is the sudden return steering.

When the steering determination unit 41 determines that the steering of the driver is the sudden return steering that is performed over the steering position at the beginning of the sudden steering, the wobble determination unit 42 has a function of being more likely to determine that the vehicle wobbles as the amount of sudden return steering increases. In addition, the wobble determination unit 42 has a function of determining that the vehicle wobbles when the steering determination unit 41 determines that the steering of the driver is the sudden return steering which is performed over the steering position at the beginning of the sudden steering.

The wobble determination unit 42 also has a function of determining that the vehicle wobbles when the steering determination unit 41 determines that the steering of the driver is the sudden return steering which is performed over the steering position in the non-steering state. The wobble determination unit 42 does not perform the wobble determination process when the vehicle speed transmitted from the vehicle speed sensor 2 to the ECU 4 is equal to or greater than a predetermined value.

Figure 2:
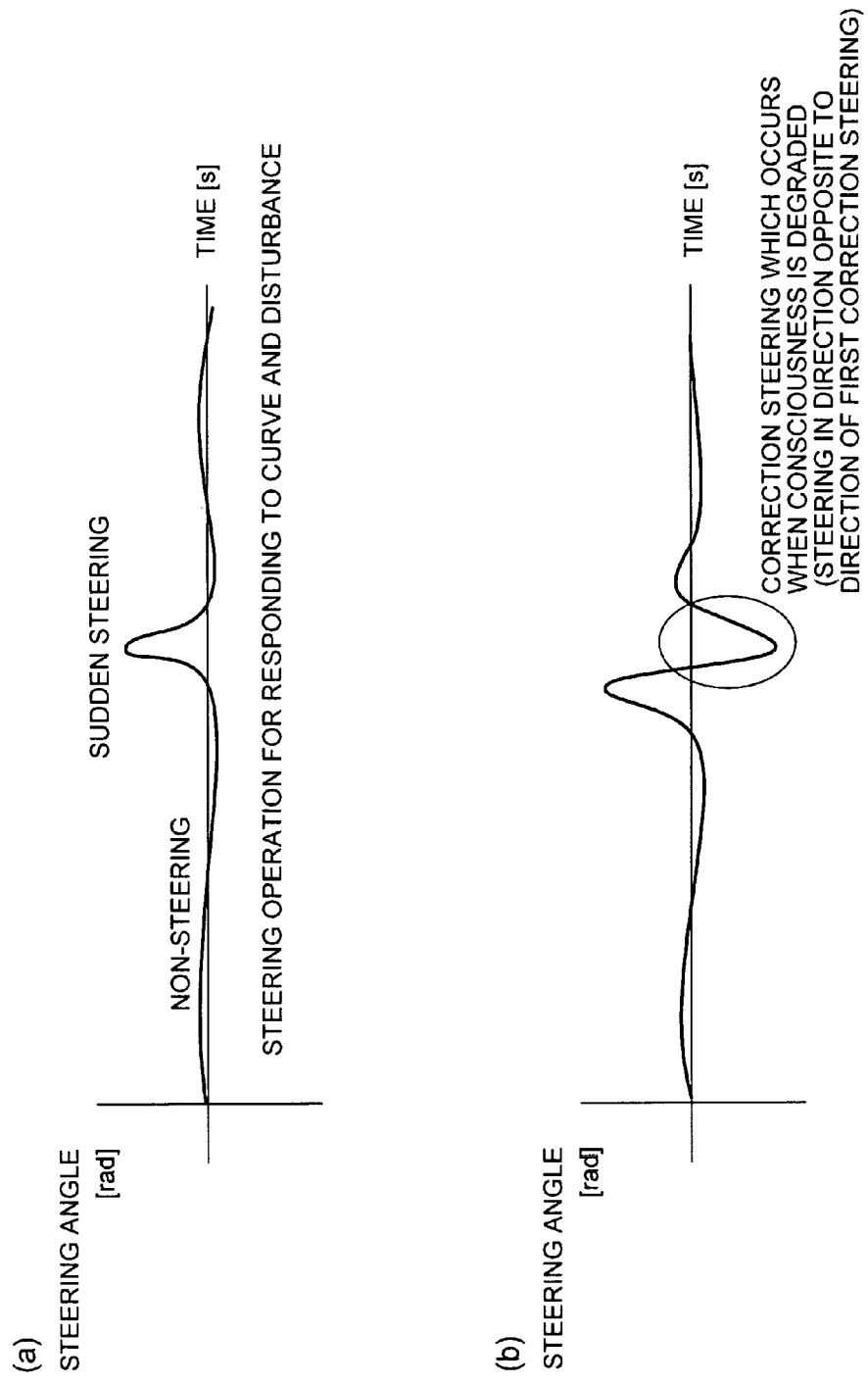
FIG. 2 is a diagram illustrating a difference between vehicle parameters during normal driving and during driving when consciousness is degraded.

The reason why the wobble determination unit 42 determines that the vehicle wobbles when the sudden return steering is performed will be described with reference to FIG. 2. FIG. 2 is a diagram illustrating the difference between vehicle parameters during normal driving and during driving when the consciousness of the driver is degraded. In FIG. 2, the horizontal axis indicates time [s] and the vertical axis indicates a steering angle [rad]. For example, the steering angle has a positive value when the driver turns the steering wheel to the right and has a negative value when the driver turns the steering wheel to the left.

FIG. 2(a) illustrates vehicle parameters observed in a steering operation for responding to a curve or a side wind during normal driving. In this case, the driver performs sudden steering for responding to the curve or the side wind once. In the steering which is performed in the opposite direction after the sudden steering, the steering position does not greatly deviate from the steering position before the sudden steering starts. In correction steering illustrated in FIG. 2(b) which occurs when the consciousness of the driver is degraded, the steering in the opposite direction greatly deviates from the steering position before the sudden steering starts. As described above, when the sudden return steering in which a steering input in the opposite direction is equal to or greater than a predetermined value within a predetermined period of time is performed, it is determined that the vehicle wobbles. Therefore, it is possible to appropriately detect the wobble of the vehicle due to the degradation of the consciousness of the driver.

The driving assistance unit 5 has a function of generating an image or a message for issuing a warning to the driver of the vehicle, calling the attention of the driver, and giving advice to the driver and displays the image on a meter or a navigation system or outputs the message as a sound from a speaker. The driving assistance unit can perform a process of changing the air pressure of an air suspension to call the attention of the driver using vibration (air suspension control) or a process of calling the attention of the driver and performing steering correction using a lane keeping assist system (LKA), in addition to the process of calling the attention of the driver using the meter or the navigation system and the speaker.

Figure 3:
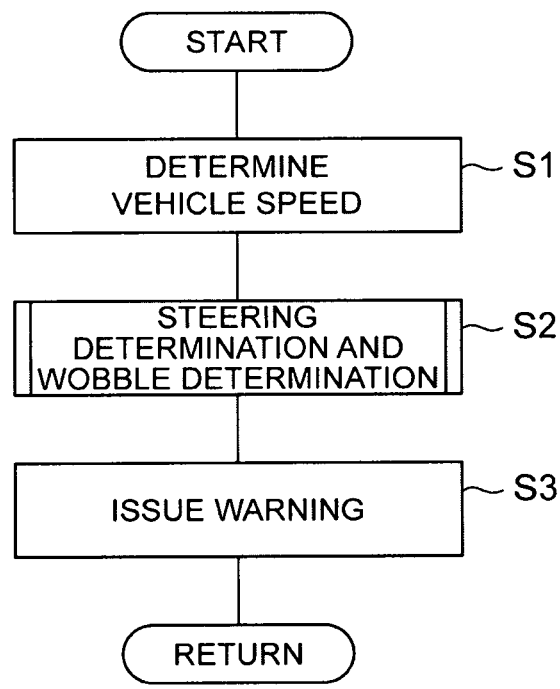
FIG. 3 is a flowchart illustrating a series of processes from a wobble determination process to a process of issuing a warning to a driver in the wobble determination devices according to the first to seventh embodiments.

Next, the processes from the wobble determination process to the process of issuing a warning to the driver in the wobble determination device 1 according to the first embodiment will be described with reference to FIG. 3. FIG. 3 is a flowchart illustrating the series of processes from the wobble determination process to the process of issuing a warning to the driver in the wobble determination device 1 according to the first embodiment. The processes illustrated in FIG. 3 start, for example, when the ignition is turned on and are repeatedly performed in a predetermined cycle.

As illustrated in S1 of FIG. 3, in the operation of the wobble determination device 1, first, the vehicle speed acquired by the vehicle speed sensor 2 is transmitted to the ECU 4 and the process proceeds to S2 when the vehicle speed is equal to or greater than a predetermined value.

In S2, when the steering determination unit 41 determines that sudden return steering is performed over the steering position in the non-steering state in the direction opposite to the direction of sudden steering and the wobble determination unit determines that the vehicle wobbles, the process proceeds to S3.

Then, in S3, the driving assistance unit 5 pedant's the warning process. The warning process is performed to restore the driver from the degraded state of consciousness. When the process in S3 ends, a series of control processes ends.

Figure 4:
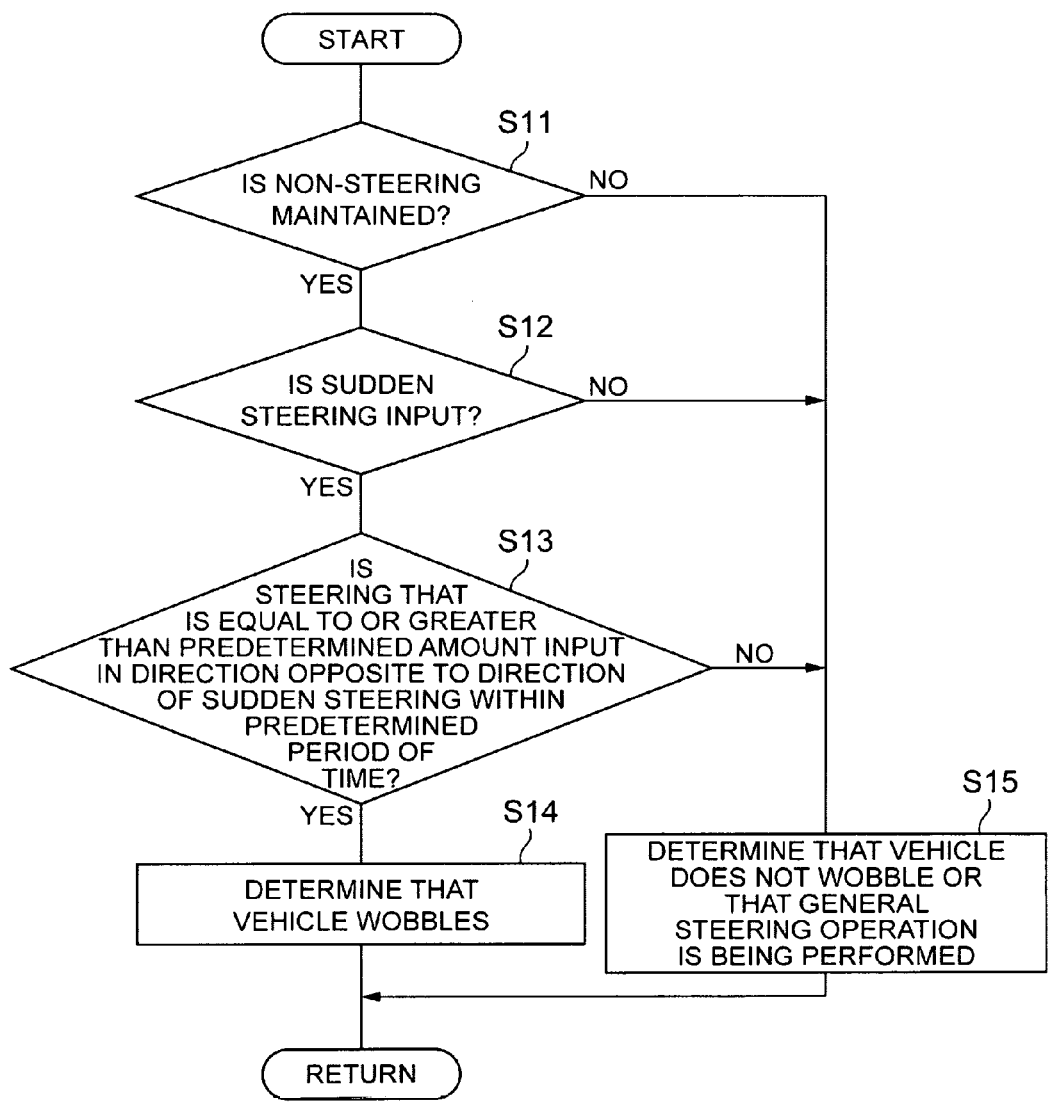
FIG. 4 is a flowchart illustrating a steering determination and wobble determination process in the wobble determination device according to the first embodiment.

Here, the steering determination and wobble determination process in S2 in the wobble determination device 1 and the wobble determination method according to the first embodiment will be described in detail with reference to FIG. 4. FIG. 4 is a flowchart illustrating the steering determination and wobble determination process in the wobble determination device 1 according to the first embodiment.

As illustrated in S11 of FIG. 4, first, the steering determination unit 41 determines whether the non-steering state is maintained (steering determination step). Specifically, the steering determination unit 41 determines that the non-steering state is maintained when the steering input of the driver is equal to or less than a predetermined value for a predetermined period of time. When the steering determination unit 41 determines that the driver is in the non-steering state, the process proceeds to S15 and the wobble determination unit 42 determines that the vehicle does not wobble or that a general steering operation is being performed (wobble determination step). Then, the control process ends.

On the other hand, when the steering determination unit 41 determines that the non-steering state is maintained in S11, the process proceeds to S12 and the steering determination unit 41 determines whether sudden steering is input (steering determination step). Specifically, the steering determination unit 41 determines that the steering of the driver is sudden steering when the steering input of the driver after the non-steering state is equal to or greater than a predetermined value within a predetermined period of time. When the steering determination unit 41 determines that no sudden steering is input, the process proceeds to S15. The wobble determination unit 42 determines that the vehicle does not wobble or that the general steering operation is being performed (wobble determination step). Then, the control process ends.

On the other hand, when the steering determination unit 41 determines that sudden steering is input in S12, the process proceeds to S13 and the steering determination unit 41 determines whether sudden return steering is performed over the steering position in the non-steering state in the direction opposite to the direction of the sudden steering and the amount of sudden return steering is equal to or greater than a predetermined value within a predetermined period of time (steering determination step). When the steering determination unit 41 determines that the sudden return steering is not performed over the steering position in the non-steering state, the process proceeds to S15 and it is determined that the vehicle does not wobble or that the general steering operation is being performed (wobble determination step). Then, the control process ends. When it is determined in S13 that the sudden return steering is performed over the steering position in the non-steering state, the process proceeds to S14 and the wobble determination unit 42 determines that the vehicle wobbles (wobble determination step). Then, the control process ends.

As described above, according to the wobble determination device 1 of this embodiment, it is possible to determine that the vehicle wobbles when sudden return steering is performed over the steering position in the non-steering state in the direction opposite to the direction of sudden steering after the sudden steering. As illustrated in FIG. 2(b), the sudden return steering operation which is performed over the steering position in the non-steering state in the direction opposite to the direction of the sudden steering (first correction steering) after the sudden steering is considered as correction steering which occurs when the consciousness of the driver is degraded. When it is assumed that the consciousness of the driver is degraded, it is possible to appropriately determine the wobble of the vehicle. In contrast, as illustrated in FIG. 2(b), when sudden steering is performed, but sudden return steering is not performed over the steering position in the non-steering state in the direction opposite to the direction of the sudden steering, it is assumed that the steering is performed in order to simply respond to a variation (a curve or a side wind) in the environment around the vehicle and it is determined that the wobble of the vehicle is not caused by the degradation of the consciousness of the driver. In this way, it is possible to prevent the wobble of the vehicle which does not occur due to the degradation of the consciousness of the driver from being erroneously determined to be the wobble of the vehicle which occurs due to the degradation of the consciousness of the driver. Therefore, it is possible to provide a wobble determination device which can appropriately determine the wobble of the vehicle and does not cause inconvenience for the driver.

According to the wobble determination device 1 of this embodiment, the steering determination unit 41 determines that the driver is in the non-steering state when the steering input of the driver is equal to or less than a predetermined value for a predetermined period of time and determines that the driver performs sudden steering when the steering input of the driver is equal to or greater than a predetermined value within a predetermined period of time after the non-steering state. Therefore, it is possible to appropriately define the non-steering state and the sudden steering and to accurately determine whether the vehicle wobbles.

According to the wobble determination device 1 of this embodiment, when the steering input of the driver is equal to or greater than a predetermined value within a predetermined period of time after sudden steering and the steering direction is opposite to the direction of the sudden steering, the steering determination unit 41 determines that the steering which is performed in the opposite direction is sudden return steering. Therefore, it is possible to easily determine the sudden return steering and to easily determine whether the vehicle wobbles.

Second Embodiment

Next, a second embodiment will be described with reference to FIGS. 5 and 6. If possible, the same components are denoted by the same reference numerals and the description thereof will not be repeated. In addition, in this embodiment, the differences from the first embodiment will be mainly described and the description of the same structures and processes (the structure of the wobble determination device 1 illustrated in FIG. 1 and the series of processes from the wobble determination process to the process of issuing a warning to the driver in the wobble determination device 1 illustrated in FIG. 3) as those in the first embodiment will not be repeated.

Figure 5:
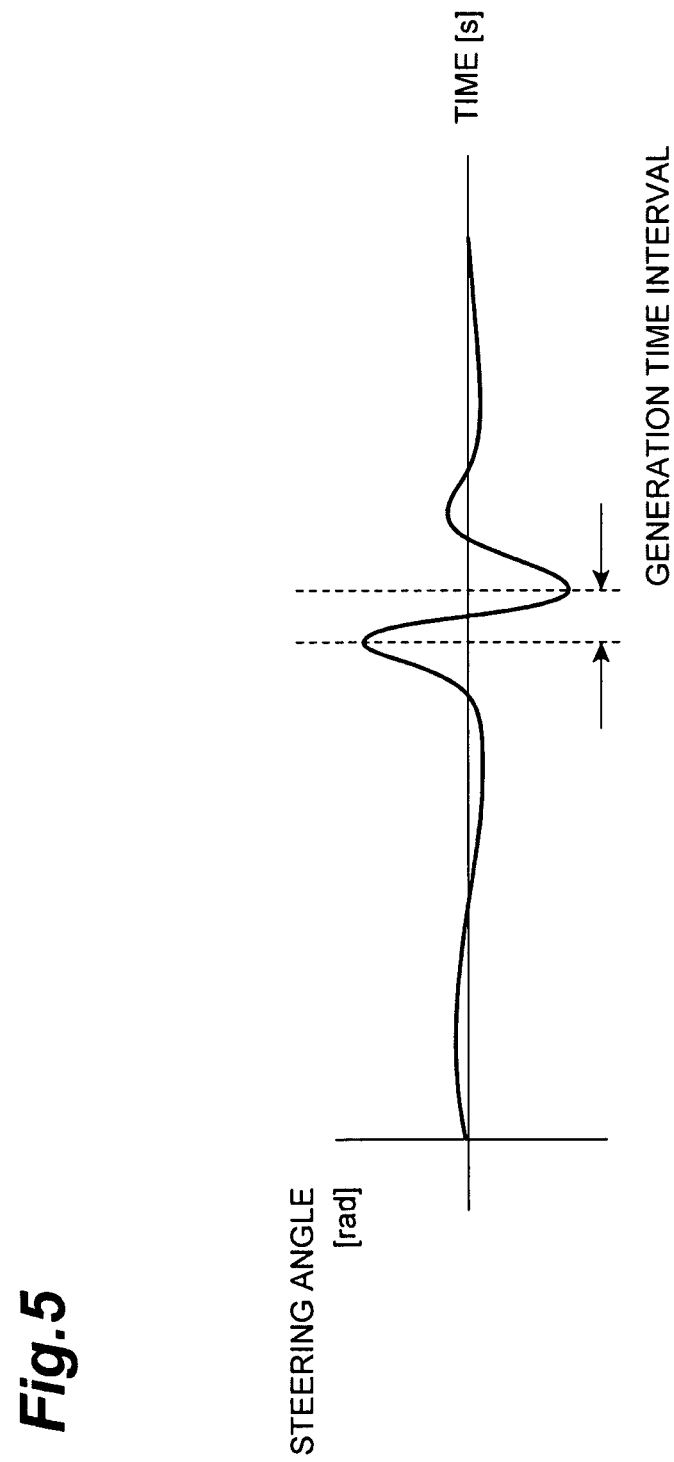
FIG. 5 is a diagram illustrating a time interval T at which steering is performed in an opposite direction.
Figure 6:
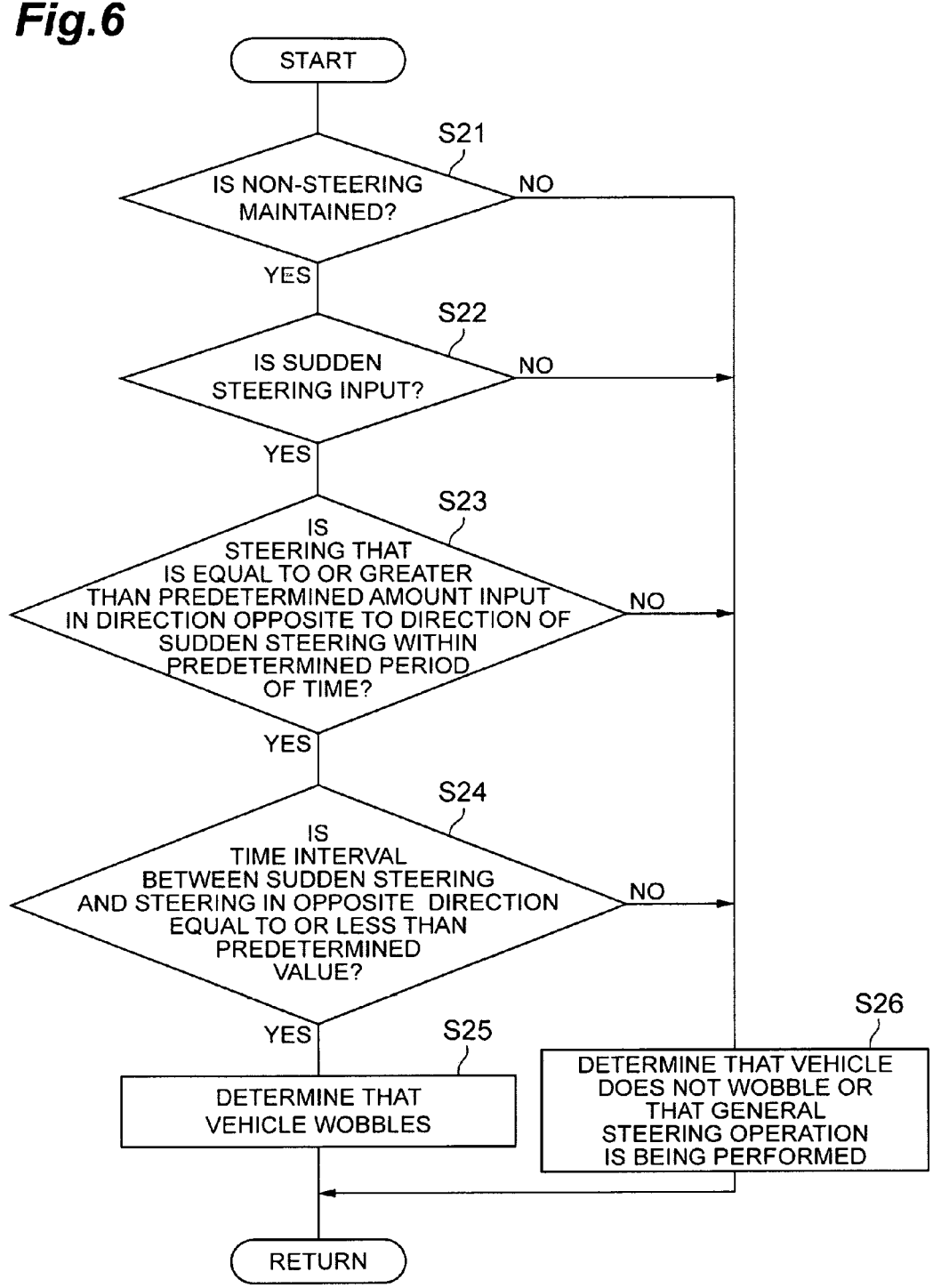
FIG. 6 is a flowchart illustrating a steering determination and wobble determination process in the wobble determination device according to the second embodiment.

FIG. 5 is a diagram illustrating a time interval T at which steering is performed in the opposite direction. In FIG. 5, the horizontal axis indicates time [s] and the vertical axis indicates a steering angle [rad]. For example, the steering angle has a positive value when the driver turns the steering wheel to the right and has a negative value when the driver turns the steering wheel to the left.

As illustrated in FIG. 5, the time interval T at which steering is performed in the opposite direction is from the time when a steering input is the maximum during sudden steering to the time when a steering input is the maximum during the steering in the opposite direction.

A steering determination unit 41 according to this embodiment determines that the steering in the opposite direction is sudden return steering when the time interval from the time when a steering input is the maximum during the sudden steering to the time when a steering input is the maximum during the steering in the direction opposite to the direction of the sudden steering is equal to or less than a predetermined value.

Next, a steering determination and wobble determination process in a wobble determination device 1 and a wobble determination method according to the second embodiment will be described with reference to FIG. 6. FIG. 6 is a flowchart illustrating the steering determination and wobble determination process in the wobble determination device 1 according to the second embodiment.

A determination process in S21 which determines whether a non-steering state is maintained, a determination process in S22 which determines whether sudden steering is input, and a determination process in S23 which determines whether steering is input over a steering position in the non-steering state in a direction opposite to the direction of sudden steering and the amount of steering is equal to or greater than a predetermined value within a predetermined period of time are the same as the determination processes in S11 to S13 in the first embodiment, respectively.

When it is determined in S23 that steering is input over the steering position in the non-steering state in the direction opposite to the direction of the sudden steering and the amount of steering is equal to or greater than the predetermined value within the predetermined period of time, the process proceeds to S24 and the steering determination unit 41 determines whether the time interval from the time when a steering input is the maximum during the sudden steering to the time when a steering input is the maximum during the steering in the direction opposite to the direction of the sudden steering is equal to or less than a predetermined value. When it is determined that the time interval is equal to or less than the predetermined value, the process proceeds to S26 and a wobble determination unit 42 determines that the vehicle does not wobble or that a general steering operation is being performed. Then, the control process ends.

On the other hand, when it is determined in S24 that the time interval is equal to or less than the predetermined value, the process proceeds to S25 and the wobble determination unit 42 determines that the vehicle wobbles. Then, the control process ends.

As described above, according to the wobble determination device 1 of this embodiment, the steering determination unit 41 determines that the steering in the opposite direction is sudden return steering when the time interval from the time when a steering input is the maximum during the sudden steering to the time when a steering input is the maximum during the steering in the direction opposite to the direction of the sudden steering is equal to or less than the predetermined value. Therefore, since the time interval from the sudden steering to the steering in the direction opposite to the direction of the sudden steering can be considered, it is possible to prevent erroneous determination that the vehicle is traveling on an S-curve road. That is, it is possible to appropriately determine the wobble of the vehicle.

Third Embodiment

Figure 7:
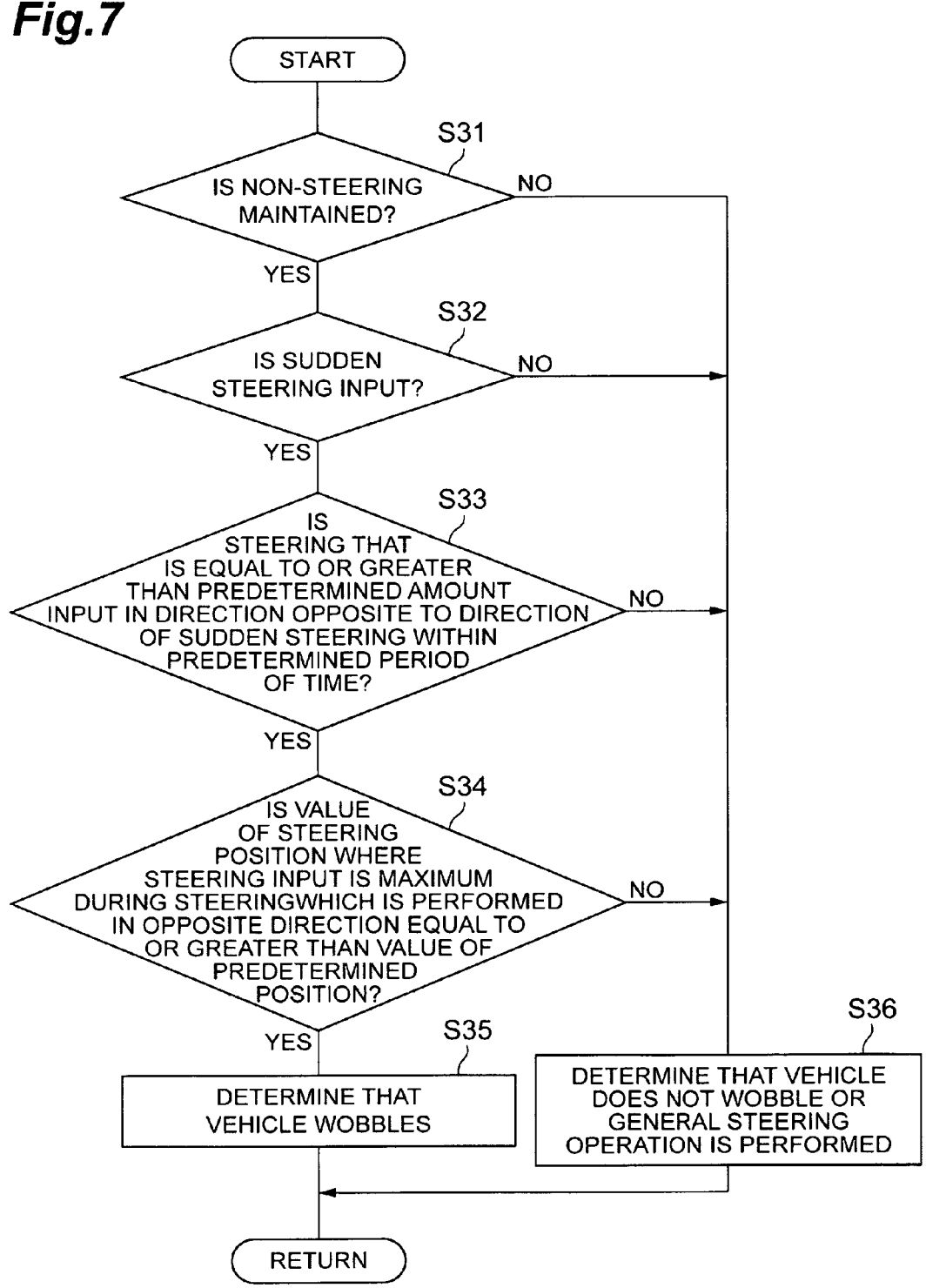
FIG. 7 is a flowchart illustrating a steering determination and wobble determination process in the wobble determination device according to the third embodiment.

Next, a third embodiment will be described with reference to FIG. 7. If possible, the same components are denoted by the same reference numerals and the description thereof will not be repeated. In addition, in this embodiment, the differences from the first and second embodiments will be mainly described and the description of the same structures and processes (the structure of the wobble determination device 1 illustrated in FIG. 1 and the series of processes from the wobble determination process to the process of issuing a warning to the driver in the wobble determination device 1 illustrated in FIG. 3) as those in the first and second embodiments will not be repeated.

A steering determination unit 41 according to this embodiment determines that steering in a direction opposite to the direction of sudden steering is sudden return steering when the value of a steering position where a steering input is the maximum during the steering in the direction opposite to the direction of the sudden steering is equal to or greater than the value of a predetermined position in the direction of the steering which is performed in the opposite direction.

The steering determination unit 41 can use, as the predetermined position, a position obtained by adding a predetermined value to a steering position in a non-steering state immediately before the steering is performed in the opposite direction in the direction of the steering which is performed in the opposite direction.

Next, a steering determination and wobble determination process in the wobble determination device 1 and a wobble determination method according to the third embodiment will be described with reference to FIG. 7. FIG. 7 is a flowchart illustrating the steering determination and wobble determination process in the wobble determination device 1 according to the third embodiment.

A determination process in S31 which determines whether a non-steering state is maintained, a determination process in S32 which determines whether sudden steering is input, and a determination process in S33 which determines whether steering is input over a steering position in the non-steering state in a direction opposite to the direction of sudden steering and the amount of steering is equal to or greater than a predetermined value within a predetermined period of time are the same as the determination processes in S11 to S13 in the first embodiment, respectively.

In S33, when steering is input over the steering position in the non-steering state in the direction opposite to the direction of the sudden steering and the amount of steering is equal to or greater than the predetermined value within the predetermined period of time, the process proceeds to S34 and the steering determination unit 41 determines whether the value of the steering position where a steering input is the maximum during the steering in the direction opposite to the direction of the sudden steering is equal to or greater than the value of the predetermined position in the direction of the steering which is performed in the opposite direction. In this case, the predetermined position is, for example, a position obtained by adding a predetermined value to the steering position in the non-steering state immediately before the steering is performed in the opposite direction in the direction of the steering which is performed in the opposite direction. When it is determined that the value of the steering position where a steering input is the maximum during the steering performed in the opposite direction is not equal to or greater than the value of the predetermined position in the direction of the steering which is performed in the opposite direction, the process proceeds to S36 and a wobble determination unit 42 determines that the vehicle does not wobble or that a general steering operation is being performed. Then, the control process ends.

On the other hand, when it is determined in S34 that the value of the steering position where the steering input is the maximum during the steering in the opposite direction is equal to or greater than the value of the predetermined position in the direction of the steering which is performed in the opposite direction, the process proceeds to S35 and the wobble determination unit 42 determines that the vehicle wobbles. Then, the control process ends.

As described above, according to the wobble determination device 1 of this embodiment, the steering determination unit 41 determines that the steering in the opposite direction is sudden return steering when the value of the steering position where the steering input is the maximum during the steering in the direction opposite to the direction of the sudden steering is equal to or greater than the value of the predetermined position in the direction of the steering which is performed in the opposite direction. Therefore, steering, which is performed in the opposite direction as correction steering which occurs when the consciousness of the driver is degraded, can be determined to be sudden return steering. That is, it is possible to appropriately determine the wobble of the vehicle.

In addition, according to the wobble determination device 1 of this embodiment, the steering determination unit 41 uses, as the predetermined position, the position obtained by adding a predetermined value to the steering position in the non-steering state immediately before steering is performed in the opposite direction in the direction of the steering which is performed in the opposite direction. Therefore, it is possible to improve criteria for determining the sudden return steering and to prevent the wobble of the vehicle due to correction steering from being erroneously determined to be the wobble of the vehicle due to the degradation of the consciousness of the driver.

Fourth Embodiment

Next, a fourth embodiment will be described with reference to FIGS. 8 and 9. If possible, the same components are denoted by the same reference numerals and the description thereof will not be repeated. In addition, in this embodiment, the differences from the first to third embodiments will be mainly described and the description of the same structures and processes (the structure of the wobble determination device 1 illustrated in FIG. 1 and a series of processes from the wobble determination process to the process of issuing a warning to the driver in the wobble determination device 1 illustrated in FIG. 3) as those in the first embodiment will not be repeated.

Figure 8:
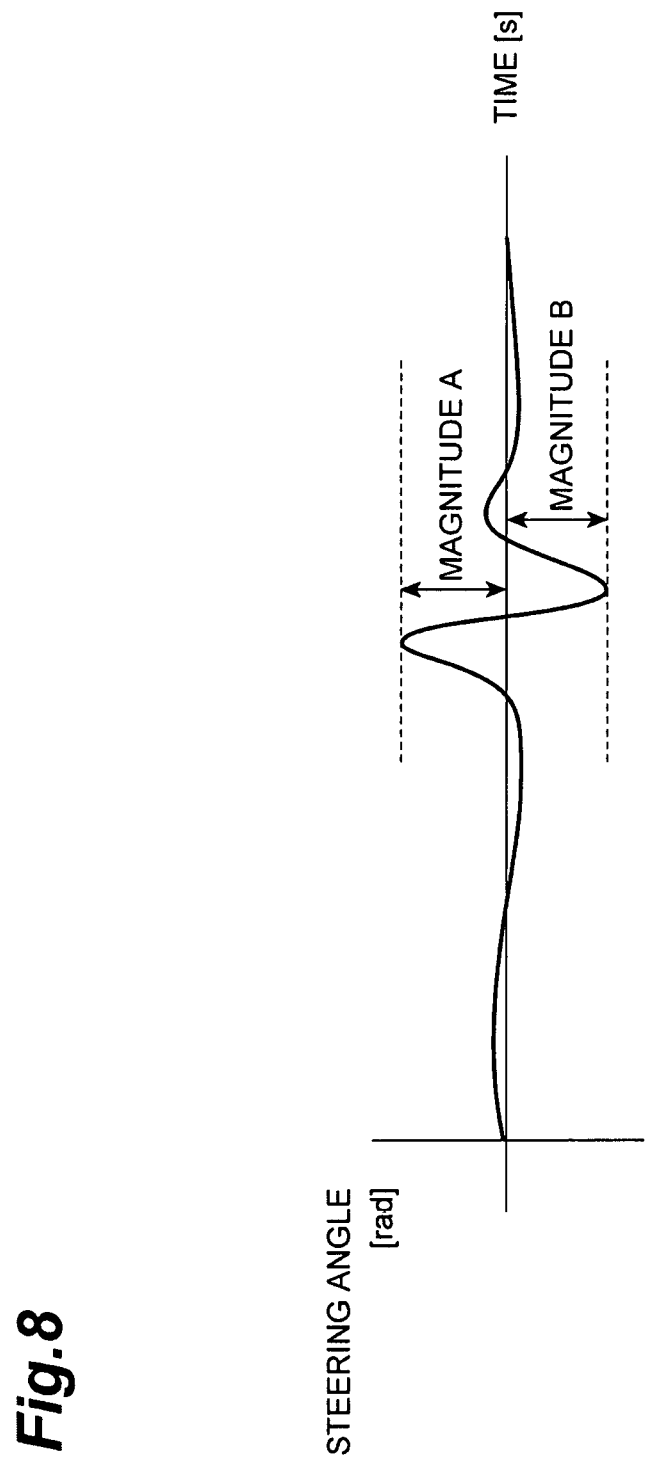
FIG. 8 is a diagram illustrating the ratio of the amount of sudden steering and the amount of steering in the opposite direction.
Figure 9:
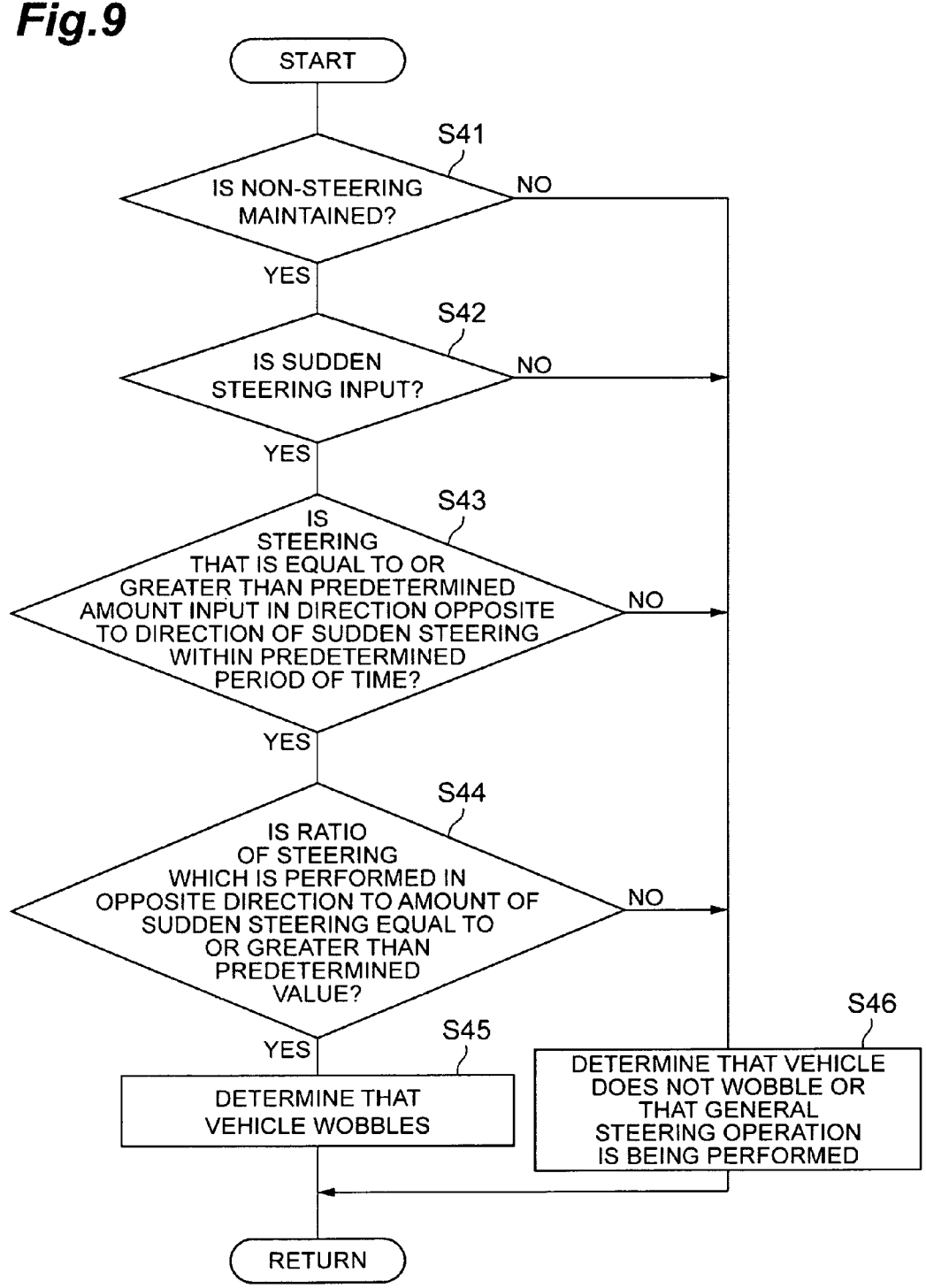
FIG. 9 is a flowchart illustrating a steering determination and wobble determination process in the wobble determination device according to the fourth embodiment.

FIG. 8 is a diagram illustrating the ratio of the amount of sudden steering to the amount of steering in the opposite direction. In FIG. 8, the horizontal axis indicates time [s] and the vertical axis indicates a steering angle [rad]. For example, the steering angle has a positive value when the driver turns the steering wheel to the right and has a negative value when the driver turns the steering wheel to the left.

As illustrated in FIG. 8, it is assumed that a first interval between a steering position in the non-steering state and a steering position where a steering input is the maximum when the driver turns the steering wheel to the right to perform sudden steering is A and a second interval between the steering position in the non-steering state and a steering position where a steering input is the maximum when the driver turns the steering wheel to the left to perform steering in a direction opposite to the direction of the sudden steering after the sudden steering is B.

A steering determination unit 41 according to this embodiment determines that the steering in the opposite direction is sudden return steering when the ratio of the second interval from the steering position in the non-steering state to the steering position where a steering input is the maximum during the steering which is performed in the opposite direction after the sudden steering to the first interval from the steering position in the non-steering state to the steering position where a steering input is the maximum during the sudden steering which is performed after the non-steering state is equal to or greater than a predetermined value. That is, when the ratio P of the second interval to the first interval (P=the second interval B/the first interval A) is equal to or greater than a predetermined value, the steering is determined to be sudden return steering.

Next, a steering determination and wobble determination process in the wobble determination device 1 and a wobble determination method according to the fourth embodiment will be described with reference to FIG. 9. FIG. 9 is a flowchart illustrating the steering determination and wobble determination process in the wobble determination device 1 according to the second embodiment.

A determination process in S41 which determines whether a non-steering state is maintained, a determination process in S42 which determines whether sudden steering is input, and a determination process in S43 which determines whether steering is input over a steering position in the non-steering state in a direction opposite to the direction of sudden steering and the amount of steering is equal to or greater than a predetermined value within a predetermined period of time are the same as the determination processes in S11 to S13 in the first embodiment, respectively.

In S43, when steering is input over the steering position in the non-steering state in the direction opposite to the direction of the sudden steering and the amount of steering is equal to or greater than the predetermined value within the predetermined period of time, the process proceeds to S44 and the steering determination unit 41 determines whether the ratio P of the second interval B from the steering position in the non-steering state to the steering position where a steering input is the maximum during the steering which is performed in the opposite direction after the sudden steering to the first interval A from the steering position in the non-steering state to the steering position where a steering input is the maximum during the sudden steering which is performed after the non-steering state is equal to or greater than a predetermined value. When it is determined that the ratio P is not equal to or greater than the predetermined value, the process proceeds to S46 and a wobble determination unit 42 determines that the vehicle does not wobble. Then, the control process ends.

On the other hand, when it is determined in S44 that the ratio P is equal to or greater than the predetermined value, the process proceeds to S45 and the wobble determination unit 42 determines that the vehicle wobbles. Then, the control process ends.

As described above, according to the wobble determination device 1 of this embodiment, the steering determination unit 41 determines that the steering in the opposite direction is sudden return steering when the ratio of the second interval from the steering position in the non-steering state to the steering position where a steering input is the maximum during the steering which is performed in the opposite direction after the sudden steering to the first interval from the steering position in the non-steering state to the steering position where a steering input is the maximum during the sudden steering which is performed after the non-steering state is equal to or greater than the predetermined value. Therefore, a threshold value for determining the sudden return steering is not an absolute value, but can be the ratio of the steering positions. As a result, it is possible to ensure constant determination accuracy, regardless of the vehicle speed or the type of vehicle.

Fifth Embodiment

Next, a fifth embodiment of the invention will be described with reference to FIG. 10. If possible, the same components are denoted by the same reference numerals and the description thereof will not be repeated.

Figure 10:
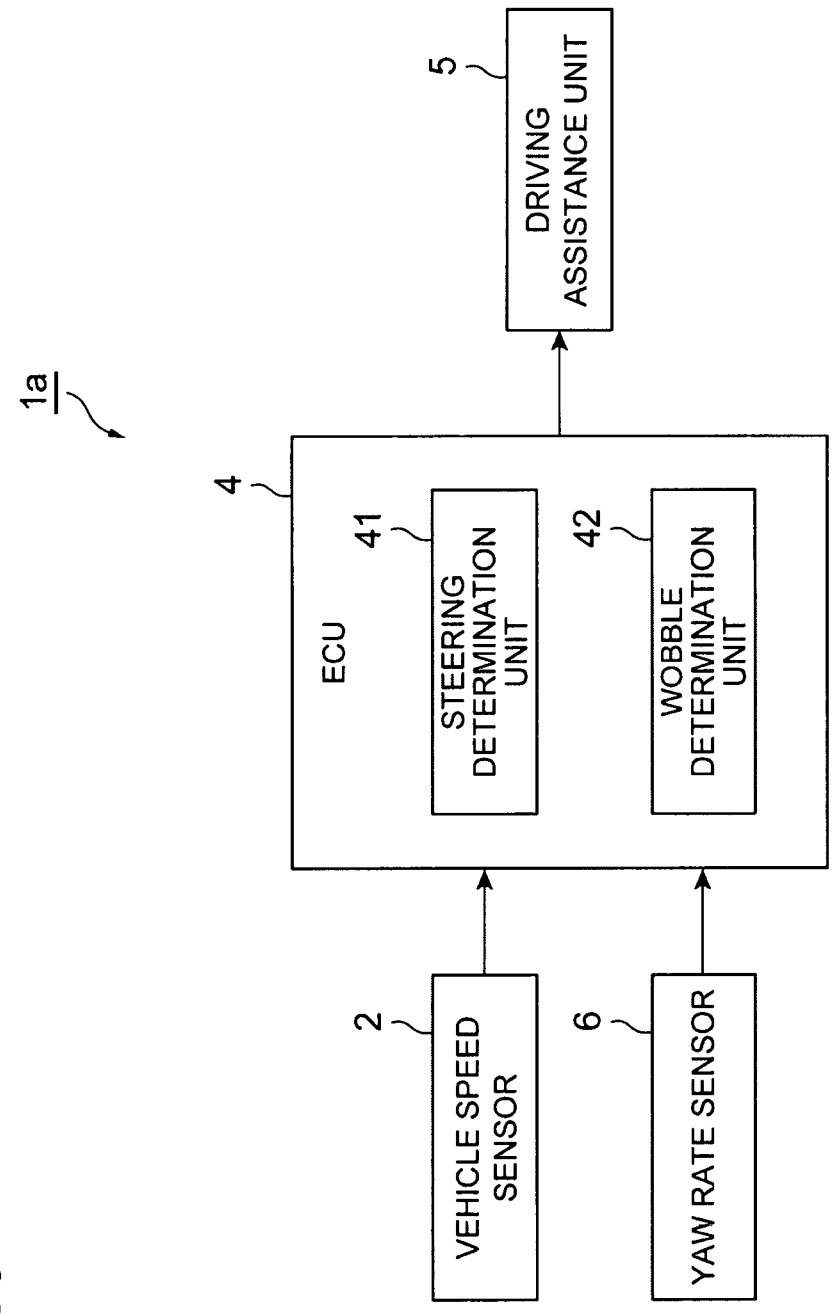
FIG. 10 is a schematic diagram illustrating the structure of a wobble determination device according to the fifth embodiment.

FIG. 10 is a diagram illustrating a wobble determination device 1a according to the fifth embodiment. The wobble determination device 1a differs from the wobble determination device 1 according to the first embodiment in that it includes a yaw rate sensor 6, instead of the steering angle sensor 3.

The yaw rate sensor 6 detects the yaw rate of the vehicle. The yaw rate sensor 6 is attached to, for example, the body of the vehicle. Yaw rate information related to the yaw rate detected by the yaw rate sensor 6 is transmitted to an ECU 4, is used by a steering determination unit 41 to determine a non-steering state, sudden steering, and sudden return steering, and is used by a wobble determination unit 42 to determine the wobble of the vehicle.

Sixth Embodiment

Next, a sixth embodiment of the invention will be described with reference to FIG. 11. If possible, the same components are denoted by the same reference numerals and the description thereof will not be repeated.

Figure 11:
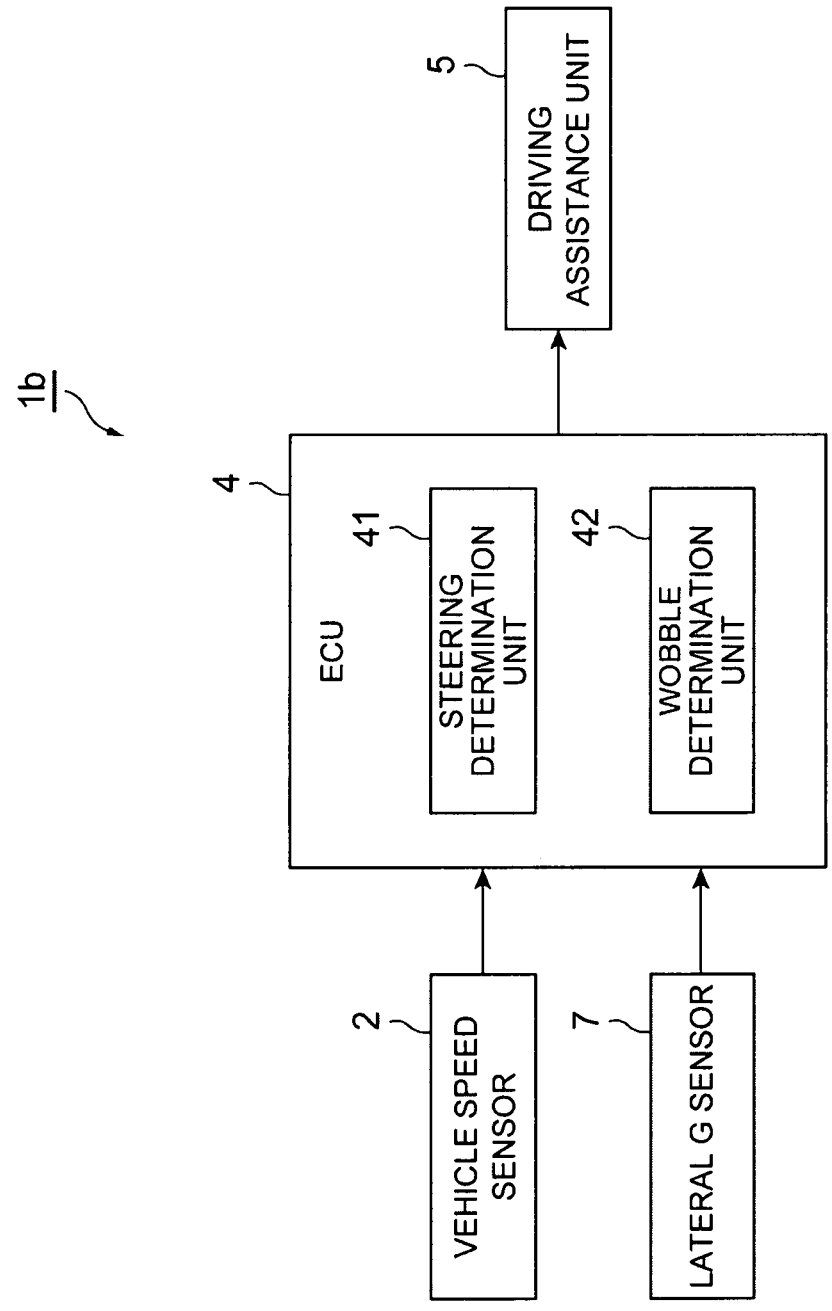
FIG. 11 is a schematic diagram illustrating the structure of a wobble determination device according to the sixth embodiment.

FIG. 11 is a diagram illustrating a wobble determination device 1b according to the sixth embodiment. The wobble determination device 1b differs from the wobble determination device 1 according to the first embodiment in that it includes a lateral G sensor 7, instead of the steering angle sensor 3.

The lateral G sensor 7 detects the acceleration of the vehicle in the lateral direction. Lateral G means lateral force which is applied to the vehicle when the vehicle rounds a curve. Information related to the lateral G detected by the lateral G sensor 7 is transmitted to an ECU 4, is used by a steering determination unit 41 to determine a non-steering state, sudden steering, and sudden return steering, and is used by a wobble determination unit 42 to determine the wobble of the vehicle.

Seventh Embodiment

Next, a seventh embodiment of the invention will be described with reference to FIG. 12. If possible, the same components are denoted by the same reference numerals and the description thereof will not be repeated.

Figure 12:
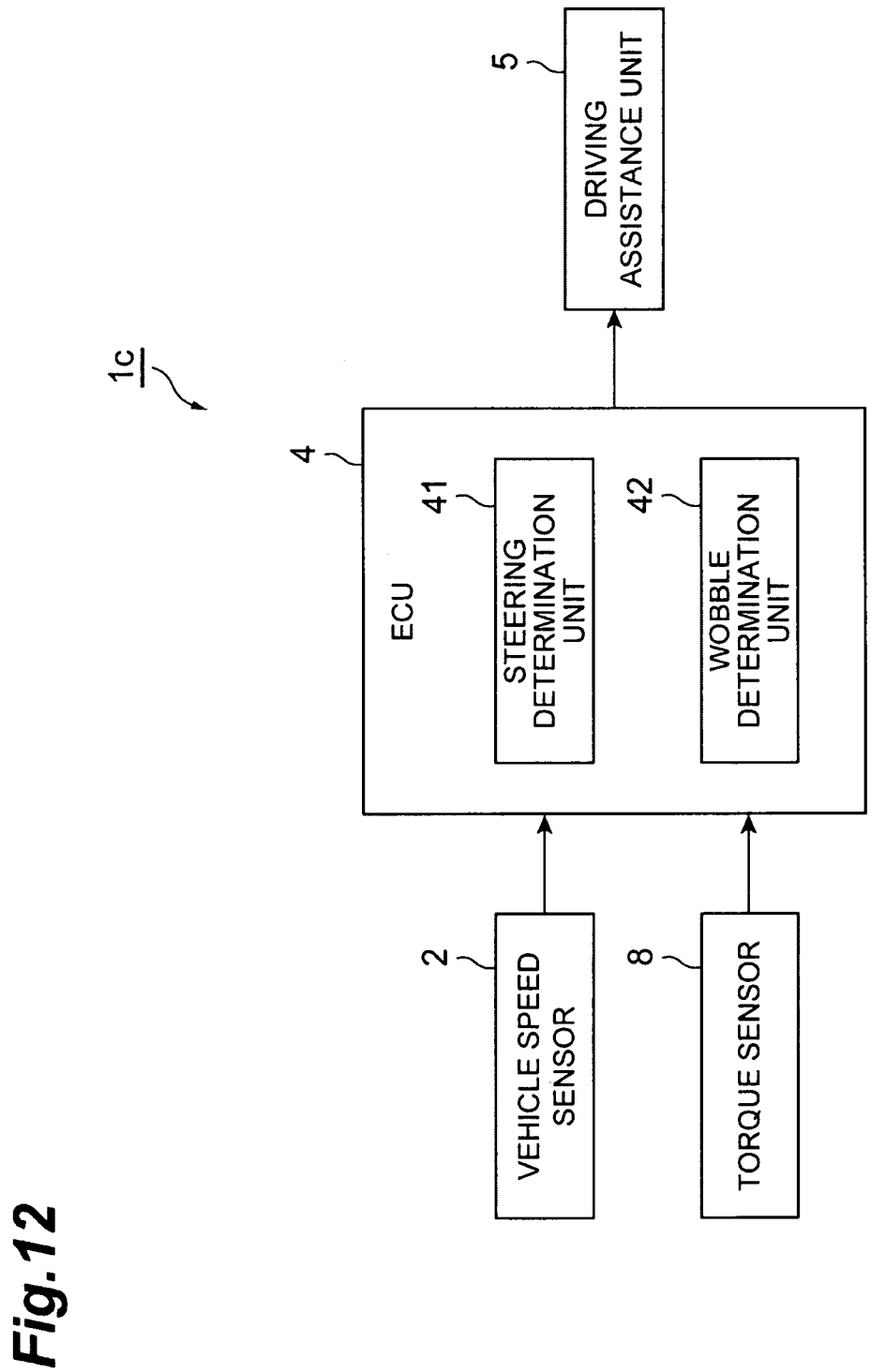
FIG. 12 is a schematic diagram illustrating the structure of a wobble determination device according to the seventh embodiment.

FIG. 12 is a diagram illustrating a wobble determination device 1c according to the seventh embodiment. The wobble determination device 1c differs from the wobble determination device 1 according to the first embodiment in that it includes a torque sensor 8, instead of the steering angle sensor 3.

The torque sensor 8 transmits a signal corresponding to the magnitude of steering torque which is applied to a steering wheel by the driver to an ECU 4. The torque sensor 8 includes an input shaft which is provided on the steering wheel side and an output shaft which is provided on the gear side and the input shaft and the output shaft are connected to each other by a torsion bar. The torque sensor 8 is provided in, for example, a steering column. Information related to the steering torque detected by the torque sensor 8 is transmitted to an ECU 4, is used by a steering determination unit 41 to determine a non-steering state, sudden steering, and sudden return steering, and is used by a wobble determination unit 42 to determine the wobble of the vehicle.

The preferred embodiments of the invention have been described above. However, the invention is not limited to the above-described embodiments. Modifications and changes of the invention can be made without departing from the scope of the claims or the invention can be applied to other devices.

For example, any of the steering angle sensor 3, the yaw rate sensor 6, the lateral G sensor 7, and the torque sensor 8 acquires information for performing the steering determination and the wobble determination. However, the invention is not limited thereto. For example, a white line camera may be used to acquire the information. The steering angle sensor 3 used in this embodiment has an advantage in that it can reduce manufacturing costs while maintaining the detection accuracy of wobble better than the white line camera.

When any of the steering angle sensor 3, the yaw rate sensor 6, the lateral G sensor 7, and the torque sensor 8 is used, for example, the differential value of parameters obtained from each sensor or a bypass filter may be used to cut low-frequency noise, considering the influence of a zero point shift.

In addition, a threshold value setting dial may be provided in the wobble determination device 1 such that the driver can set various threshold values for determining the non-steering state, the sudden steering, and the sudden return steering. In this case, it is possible to freely customize various threshold values according to the preferences of the driver or the characteristics of the vehicle.

Furthermore, a snooze switch may be provided in the wobble determination device 1. In this case, when the driving assistance unit 5 performs the warning process, the snooze mode can be set and the warning process can be repeatedly performed after a predetermined period of time has elapsed.

INDUSTRIAL APPLICABILITY

The invention can be used to determine the wobble of a host vehicle and to control the host vehicle while the vehicle is traveling.

REFERENCE SIGNS LIST

1, 1*a*, 1*b*, 1*c*: WOBBLE DETERMINATION DEVICE
2: VEHICLE SPEED SENSOR
3: STEERING ANGLE SENSOR
4: ECU
5: DRIVING ASSISTANCE UNIT
6: YAW RATE SENSOR
7: LATERAL G SENSOR
8: TORQUE SENSOR
41: STEERING DETERMINATION UNIT
42: WOBBLE DETERMINATION UNIT

The invention claimed is:

1. A wobble determination device comprising:
a steering determination unit configured to determine whether a driver of a vehicle performs sudden steering and performs sudden return steering over a steering position at the beginning of the sudden steering in a direction opposite to a direction of the sudden steering after the sudden steering; and
a wobble determination unit configured to determine that the vehicle wobbles if the amount of sudden return steering is equal to or greater than a predetermined value within a predetermined period of time, when the steering determination unit determines that the steering of the driver is the sudden return steering which is performed over the steering position at the beginning of the sudden steering,
wherein, when a time interval from a time when a steering input is the maximum during the sudden steering to a time when a steering input is the maximum during steering which is performed in the direction opposite to the direction of the sudden steering is equal to or less than a predetermined value, the steering determination unit determines that the steering in the opposite direction is the sudden return steering.

2. A wobble determination device comprising:
a steering determination unit configured to determine whether a driver of a vehicle performs sudden steering and performs sudden return steering over a steering position at the beginning of the sudden steering in a direction opposite to a direction of the sudden steering after the sudden steering; and
a wobble determination unit configured to determine that the vehicle wobbles when the steering determination unit determines that the steering of the driver is the sudden return steering which is performed over the steering position at the beginning of the sudden steering,
wherein, when a time interval from a time when a steering input is the maximum during the sudden steering to a time when a steering input is the maximum during steering which is performed in the direction opposite to the direction of the sudden steering is equal to or less than a predetermined value, the steering determination unit determines that the steering in the opposite direction is the sudden return steering.

3. A wobble determination device comprising:
a steering determination unit configured to determine whether a driver of a vehicle performs sudden steering after a non-steering state of the driver is maintained for a predetermined period of time and performs sudden return steering over a steering position in the non-steering state in a direction opposite to a direction of the sudden steering after the sudden steering; and
a wobble determination unit configured to determine that the vehicle wobbles when the steering determination unit determines that the steering of the driver is the sudden return steering which is performed over the steering position in the non-steering state,
wherein, when a time interval from a time when a steering input is the maximum during the sudden steering to a time when a steering input is the maximum during steering which is performed in the direction opposite to the direction of the sudden steering is equal to or less than a predetermined value, the steering determination unit determines that the steering in the opposite direction is the sudden return steering.

4. The wobble determination device according to claim 3, wherein the steering determination unit determines that the driver is in the non-steering state when a steering input of the driver is equal to or less than a predetermined value for a predetermined period of time and determines that the steering of the driver is the sudden steering when the steering input of the driver after the non-steering state is equal to or greater than the predetermined value for the predetermined period of time.

5. The wobble determination device according to claim 3, wherein, when the steering input of the driver is equal to or greater than the predetermined value for the predetermined period of time and the steering is performed in the direction opposite to the direction of the sudden steering after the sudden steering, the steering determination unit determines that the steering in the opposite direction is the sudden return steering.

6. The wobble determination device according to any one of claims 3,
wherein the steering determination unit determines that the steering in the opposite direction is the sudden return steering when a value of a steering position where a steering input is the maximum during the steering which is performed in the direction opposite to the direction of the sudden steering is equal to or greater than a value of a predetermined position in the direction of the steering which is performed in the direction opposite to the direction of the sudden steering.

7. The wobble determination device according to claim 6, wherein the steering determination unit uses, as the predetermined position, a position which is obtained by adding a predetermined value to the steering position in the non-steering state immediately before the steering in the opposite direction is performed in the direction of the steering which is performed in the opposite direction.

8. The wobble determination device according to any one of claims 3,
wherein the steering determination unit determines that the steering in the opposite direction is the sudden return steering when a first interval is from the steering position in the non-steering state to a steering position where a steering input is the maximum during the sudden steering which is performed after the non-steering state, a second interval is from the steering position in the non-steering state to a steering position where a steering input is the maximum during the steering which is performed in the opposite direction after the sudden steering, and a ratio of the second interval to the first interval is equal to or greater than a predetermined value.

9. A wobble determination method by a wobble determination device, the method comprising:
a steering determination step of determining, by a steering determination unit, whether a driver of a vehicle performs sudden steering and performs sudden return steering over a steering position at the beginning of the sudden steering in a direction opposite to a direction of the sudden steering after the sudden steering; and
a wobble determination step of determining, by a wobble determination unit, that the vehicle wobbles if the amount of sudden return steering is equal to or greater than a predetermined value within a predetermined period of time, when it is determined in the steering determination step that the steering of the driver is the sudden return steering which is performed over the steering position at the beginning of the sudden steering,
wherein, when a time interval from a time when a steering input is the maximum during the sudden steering to a time when a steering input is the maximum during steering which is performed in the direction opposite to the direction of the sudden steering is equal to or less than a predetermined value, the steering determination step determines that the steering in the opposite direction is the sudden return steering.

10. A wobble determination method by a wobble determination device, the method comprising:
a steering determination step of determining, by a steering determination unit, whether a driver of a vehicle performs sudden steering and performs sudden return steering over a steering position at the beginning of the sudden steering in a direction opposite to a direction of the sudden steering after the sudden steering; and
a wobble determination step of determining, by a wobble determination unit, that the vehicle wobbles when it is determined in the steering determination step that the steering of the driver is the sudden return steering which is performed over the steering position at the beginning of the sudden steering,
wherein, when a time interval from a time when a steering input is the maximum during the sudden steering to a time when a steering input is the maximum during steering which is performed in the direction opposite to the direction of the sudden steering is equal to or less than a predetermined value, the steering determination step determines that the steering in the opposite direction is the sudden return steering.

11. A wobble determination method by a wobble determination device, the method comprising:
a steering determination step of determining, by a steering determination unit, whether a driver of a vehicle performs sudden steering after a non-steering state of the driver is maintained for a predetermined period of time and performs sudden return steering over a steering position in the non-steering state in a direction opposite to a direction of the sudden steering after the sudden steering; and
a wobble determination step of determining, by a wobble determination unit, that the vehicle wobbles when it is determined in the steering determination step that the steering of the driver is the sudden return steering which is performed over the steering position in the non-steering state,
wherein, when a time interval from a time when a steering input is the maximum during the sudden steering to a time when a steering input is the maximum during steering which is performed in the direction opposite to the direction of the sudden steering is equal to or less than a predetermined value, the steering determination step determines that the steering in the opposite direction is the sudden return steering.

* * * * *